(12) United States Patent
Cornelius et al.

(10) Patent No.: US 7,653,776 B2
(45) Date of Patent: Jan. 26, 2010

(54) METHOD AND APPARATUS FOR SELECTIVELY SWITCHING IC PORTS TO CARD SLOTS THROUGH THE USE OF THREE SWITCHES PER SWITCH GROUP

(75) Inventors: William P. Cornelius, Los Gatos, CA (US); Paul A. Baker, Los Altos, CA (US); Joseph P. Bratt, San Jose, CA (US)

(73) Assignee: Apple Inc., Cupertino, CA (US)

( * ) Notice: Subject to any disclaimer, the term of this patent is extended or adjusted under 35 U.S.C. 154(b) by 246 days.

(21) Appl. No.: 11/304,439

(22) Filed: Dec. 14, 2005

(65) Prior Publication Data

US 2007/0239904 A1    Oct. 11, 2007

(51) Int. Cl.
G06F 3/00    (2006.01)
G06F 13/00   (2006.01)

(52) U.S. Cl. .................. 710/316; 710/8; 710/12; 710/14; 710/38

(58) Field of Classification Search .............. None
See application file for complete search history.

(56) References Cited

U.S. PATENT DOCUMENTS

| 4,003,089 | A | * | 1/1977 | Maurer | 360/63 |
| 4,524,425 | A | * | 6/1985 | Bertails | 708/819 |
| 4,596,957 | A | * | 6/1986 | Fukaya et al. | 330/252 |
| 4,799,078 | A | * | 1/1989 | Hayama | 396/61 |
| 5,786,885 | A | * | 7/1998 | Satoh | 710/305 |
| 6,009,492 | A | * | 12/1999 | Matsuoka | 710/301 |
| 6,035,345 | A | * | 3/2000 | Lee | 710/8 |
| 6,237,057 | B1 | * | 5/2001 | Neal et al. | 710/309 |
| 6,631,436 | B1 | * | 10/2003 | Liu et al. | 710/305 |
| 7,013,361 | B2 | * | 3/2006 | Liron | 710/316 |
| 7,152,127 | B1 | * | 12/2006 | Brisebois et al. | 710/303 |
| 2005/0134292 | A1 | * | 6/2005 | Knoedgen | 324/658 |
| 2005/0259491 | A1 | * | 11/2005 | Yarbrough et al. | 365/222 |
| 2006/0088046 | A1 | * | 4/2006 | Wong et al. | 370/413 |

* cited by examiner

*Primary Examiner*—Tammara Peyton
*Assistant Examiner*—Henry Yu
(74) *Attorney, Agent, or Firm*—Park, Vaughan & Fleming LLP (57) ABSTRACT

A system that selectively couples one or more IC chips to card slots. The system contains a Z-bar switch which includes: a select input; a first IC port coupled to a first IC pin; a second IC port coupled to a second IC pin; a first card slot port coupled to a first card slot pin; and a second card slot port coupled to a second card slot pin. If the select input receives a first control pattern, the Z-bar switch is configured to: couple the first IC port to the first card slot port; and to couple the second IC port to the second card slot port. If the select input receives a second control pattern, the Z-bar switch is configured to: couple the first IC port to the second card slot port; leave the second IC port floating; and to leave the first card slot port floating.

20 Claims, 5 Drawing Sheets

METHOD AND APPARATUS FOR SELECTIVELY SWITCHING IC PORTS TO CARD SLOTS THROUGH THE USE OF THREE SWITCHES PER SWITCH GROUP

BACKGROUND

1. Field of the Invention

The present invention relates to techniques for configuring a computer system. More specifically, the present invention relates to a method and apparatus for selectively switching ports from an integrated circuit (IC) device to card slots.

2. Related Art

Some computing platforms which include peripheral component interface express (PCI-E) expansion slots have the option (per slot) of supporting ×1, ×2, ×4, ×8 or ×16 wide interfaces, if a full-sized connector is used. Although a PCI-E slot is very flexible, it is not cost-effective to support ×16 ports on all card slots because the required pin count on a corresponding chipset to support this number of pins is excessive. Therefore, a subset of the number of possible pins on the IC chip (or chips) needs to be selected. For example, card slot configurations can include one ×16 port or two ×8 ports, or one ×8 port and two ×4 ports. This allows a number of different products to be built around one chipset. Any card slot port width can, in theory, be supported. However, the wire routes on the PC board fix the target application.

Previous techniques for solving this problem do not allow the end-user to configure the allocation of PCI-E slots. The options are limited by wire routes on the PC board and available pin-out of the integrated circuit chip. Note that each card slot pin is coupled to a corresponding IC pin.

Hence, what is needed is a method and an apparatus for switching IC ports to card slots without the problems described above.

SUMMARY

One embodiment of the present invention provides a system that selectively couples one or more IC chips to card slots. The system contains a Z-bar switch which includes: a select input; a first IC port coupled to a first IC pin; a second IC port coupled to a second IC pin; a first card slot port coupled to a first card slot pin; and a second card slot port coupled to a second card slot pin. If the select input receives a first control pattern, the Z-bar switch is configured to: (1) couple the first IC port to the first card slot port; and to (2) couple the second IC port to the second card slot port. On the other hand, if the select input receives a second control pattern, the Z-bar switch is configured to: (1) couple the first IC port to the second card slot port; (2) leave the second IC port floating; and to (3) leave the first card slot port floating.

In a variation on this embodiment, the first IC port, the second IC port, the first card slot port, and the second card slot port are configured to carry differential signals.

In a further variation on this embodiment, the Z-bar switch implements part of a lane, wherein the lane is implemented using the Z-bar switch and a second Z-bar switch. Within this lane, the Z-bar switch is configured to switch signals transmitted to the card slots and the second Z-bar switch is configured to switch signals transmitted from the card slots.

In a further variation on this embodiment, the lane is one of a set of multiple lanes.

In a variation on this embodiment, the Z-bar switch includes: a third IC port coupled to a third IC pin; a fourth IC port coupled to a fourth IC pin; a third card slot port coupled to a third card slot pin; and a fourth card slot port coupled to a fourth card slot pin. If the select input receives the first control pattern, the Z-bar switch is configured to: (1) couple the first IC port to the first card slot port; (2) couple the second IC port to the second card slot port; (3) couple the third IC port to the third card slot port; and to (4) couple the fourth IC port to the fourth card slot port. If the select input receives the second control pattern, the Z-bar switch is configured to: (1) couple the first IC port to the second card slot port; (2) couple the second IC port to the third card slot port; (3) couple the third IC port to the fourth card slot port; (4) leave the fourth IC port floating; and to (5) leave the first card slot port floating. Note that this can be extended to N IC ports and N slot ports.

In a further variation, the first IC port, the second IC port, the third IC port, the fourth IC port, the first card slot port, the second card slot port, the third card slot port, and the fourth card slot port are configured to carry differential signals.

In a further variation, the Z-bar switch implements part of a lane, wherein the lane is implemented using the Z-bar switch and a second Z-bar switch. Within this lane, the Z-bar switch is configured to switch signals transmitted to the card slots and the second Z-bar switch is configured to switch signals transmitted from the card slots.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

The present invention includes a Z-bar switch which is designed to meet the 2.5 Gbps interface specification of the PCI-E standard. This Z-bar switch allows the PC board to be configured using software (for example at boot-time) to support the optimal usage of the IC PCI-E lanes/port options available to a given card slot based on the installed card configuration. The Z-bar switch can, for example, route PCI-E lanes from Source A to Destination A and from Source B to destination B, or it may route signals from Source A to Destination B. This Z-bar switch can be built with various lane widths, and can be used one or more at a time (on parallel lines) to provide a flexible mapping of IC ports to card slot ports. Note that the ports can be configured at boot-time under software control.

The present invention routes IC pins to given card slots with given lane widths based upon application requirements. For example, one end user may desire a ×16 graphics card slot, wherein the other slots in this system can be ×1 slots. Another end user may desire medium graphics performance, but may have a high-speed I/O requirement. In this case, the present invention allows a configuration of two ×8 ports and two ×1 ports, where one ×8 port is used to meet the medium graphics requirement, and one ×8 port is used to meet the high-speed I/O slot requirement. The specific configuration can be selected through software.

Z-Bar Switch

Figure 1A:
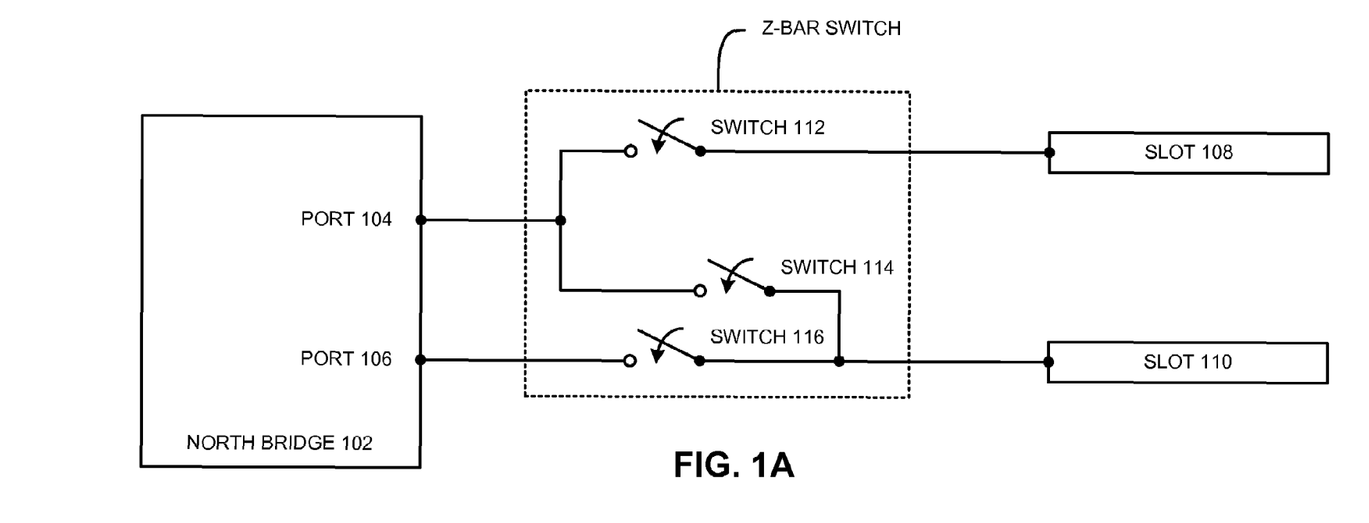
FIG. 1A illustrates a Z-bar switch in accordance with an embodiment of the present invention.

FIG. 1A illustrates a Z-bar switch in accordance with an embodiment of the present invention. More specifically, FIG. 1A illustrates Northbridge 102, IC ports 104, and 106, card slots 108 and 110, and switches 112, 114, and 116.

Figure 1B:
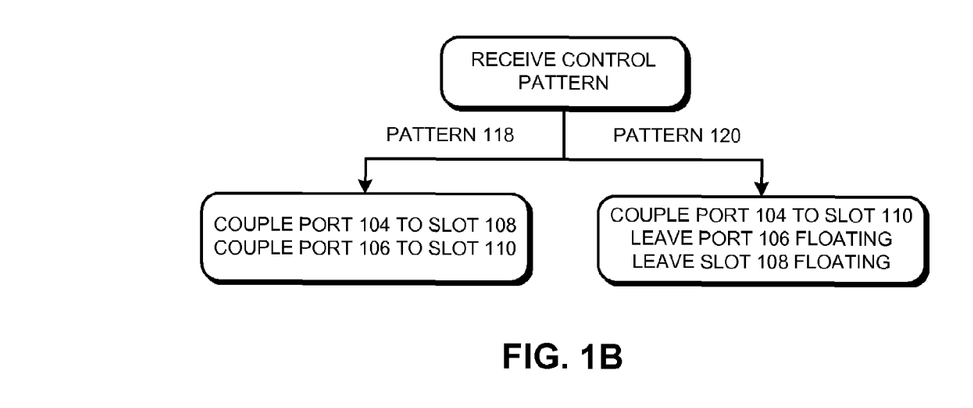
FIG. 1B presents the configuration options for the Z-bar switch in accordance with an embodiment of the present invention.

FIG. 1B presents the configuration options for the Z-bar switch illustrated in FIG. 1A in accordance with an embodiment of the present invention. If the Z-bar switch receives control pattern 118, the Z-bar switch: (1) couples IC port 104 to card slot port 108 by closing switch 112; and (2) couples IC port 106 to card slot port 110 by closing switch 116. On the other hand, if the Z-bar switch receives pattern 120, the Z-bar switch: (1) couples IC port 104 to card slot port 110 by closing switch 114; (2) leaves IC port 106 floating; and (3) leaves card slot port 108 floating. Note that control patterns 118 and 120 are applied to the select input for the Z-bar switch (not shown in FIG. 1A).

In one embodiment of the present invention, pattern 118 is a low voltage applied to the select input of the Z-bar switch, and pattern 120 is a high voltage applied to the select input of the Z-bar switch.

In one embodiment of the present invention, the IC ports and the card slots carry differential signals.

In one embodiment of the present invention, two Z-bar switches are used to implement a bi-directional "lane," such as a "PCI-E lane." Within this bidirectional lane, one Z-bar switch carries signals transmitted from the IC ports to the card slots, and a second Z-bar switch carries signals transmitted from the card slots to the IC ports.

In one embodiment of the present invention, the lane is one of multiple lanes.

Note that although a crossbar switch can be used instead of a Z-bar switch, a crossbar switch has a more-complicated layout on chip, which causes additional parasitic capacitance and resistance, thereby degrades system performance.

Figure 1C:
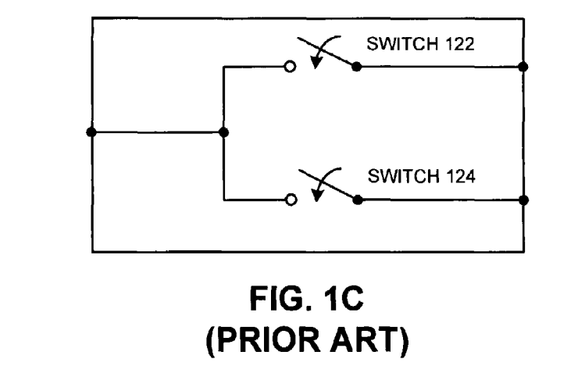
FIG. 1C illustrates a switching device.
Figure 1D:
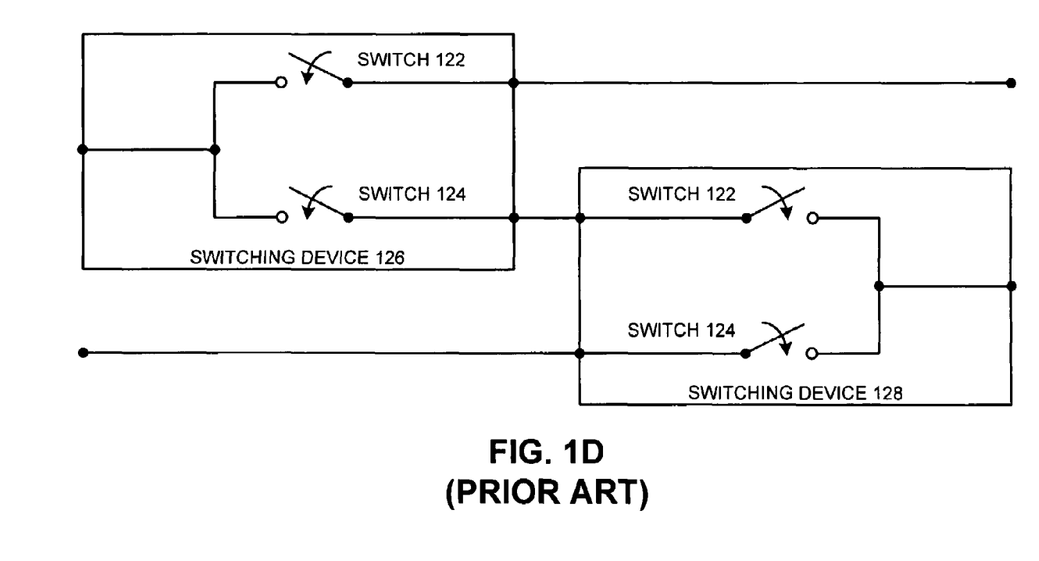
FIG. 1D illustrates a switching device configured to be a Z-bar switch.

FIG. 1C illustrates an exemplary switching device. It contains switch 122 and switch 124. If two switching devices are coupled together, they can be configured to perform the same function as the Z-bar switch. FIG. 1D illustrates a pair of switching devices configured to be a Z-bar switch. It contains switching devices 126 and 128. Note that a Z-bar switch constructed from two such switching devices is somewhat inferior to an integrated Z-bar switch because a signal traversing the package of switching device 126 to reach switching device 128, encounters the parasitics of each device (resistances, inductances, and capacitances), thereby degrading the signal, even to a non-functional level.

In one embodiment of the present invention, the Z-bar switch is an analog component, in which the signals are not buffered. In another embodiment, signals are buffered by the Z-bar switch.

Figure 2A:
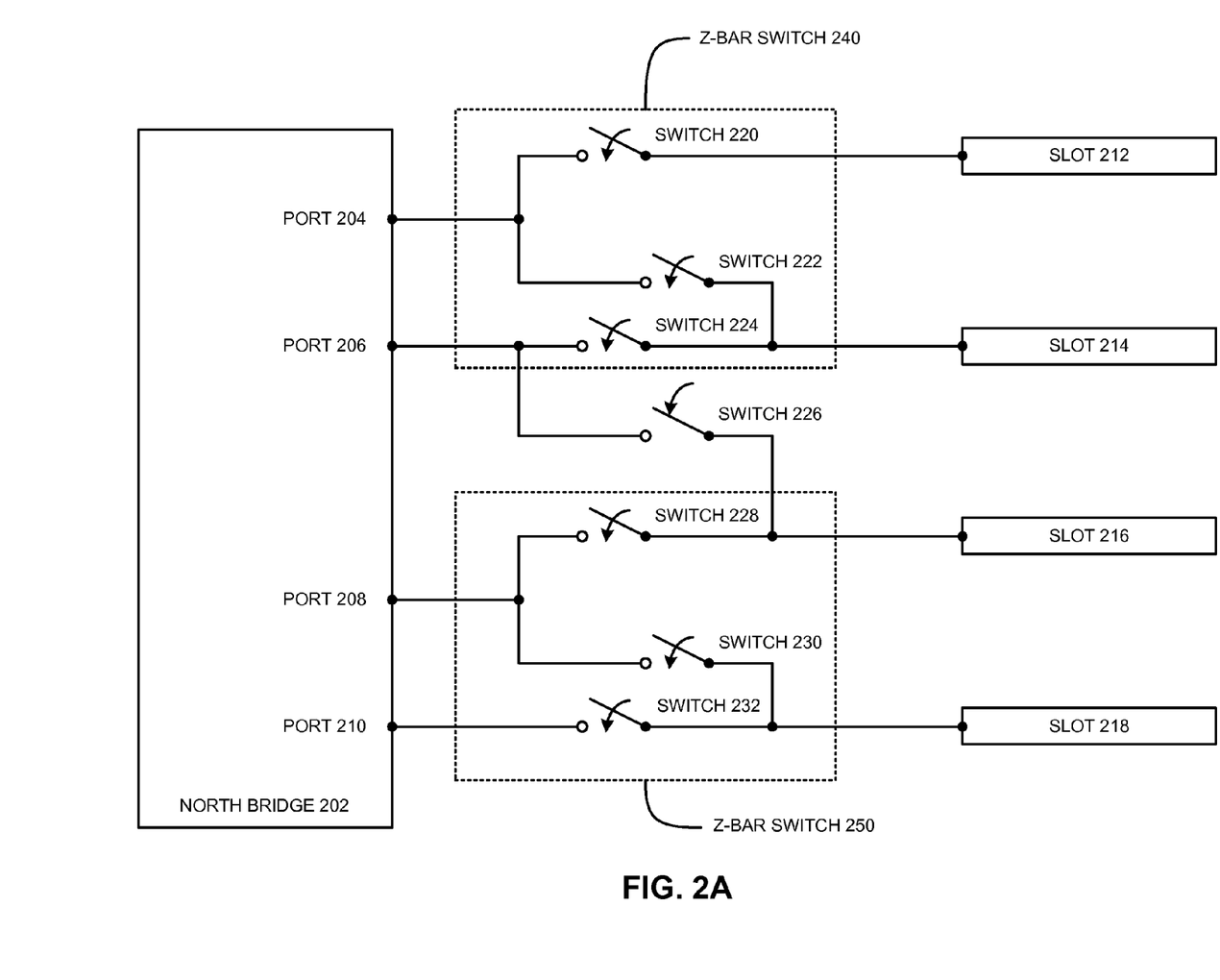
FIG. 2A illustrates a Z-bar switch in accordance with an embodiment of the present invention.

FIG. 2A illustrates a Z-bar switch arrangement in accordance with an embodiment of the present invention. More specifically, FIG. 2A contains Northbridge 202, IC ports 204, 206, 208, and 210, card slots 212, 214, 216, and 218, and Z-bar switches 240 and 250, which include switches 220, 222, 224, 226, 228, 230, and 232.

Figure 2B:
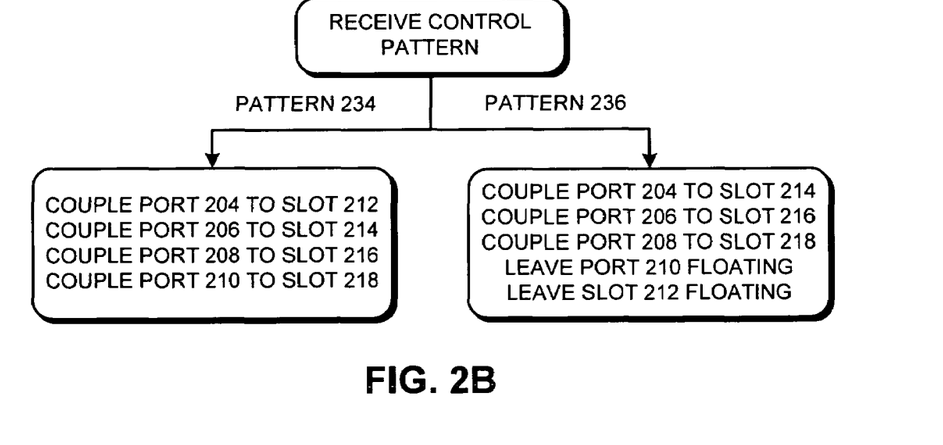
FIG. 2B presents the configuration options for the Z-bar switch in accordance with an embodiment of the present invention.

FIG. 2B presents the configuration options for the Z-bar switch arrangement illustrated in FIG. 2A in accordance with an embodiment of the present invention. If the Z-bar switch arrangement receives control pattern 234, the Z-bar switch arrangement: (1) couples IC port 204 to card slot 212 by closing switch 220; (2) couples IC port 206 to card slot 214 by closing switch 224; (3) couples IC port 208 to card slot 216 by closing switch 228; and (4) couples IC port 210 to card slot 218 by closing switch 232. On the other hand, if the Z-bar switch arrangement receives control pattern 236, the Z-bar switch arrangement: (1) couples IC port 204 to card slot 214 by closing switch 222; (2) couples IC port 206 to card slot 216 by closing switch 226; (3) couples IC port 208 to card slot 218 by closing switch 230; (4) leaves IC port 210 floating; and (5) leaves card slot 212 floating. Note that control patterns 234 and 236 are applied to the select input for the Z-bar switch arrangement (not shown in FIG. 2A). The select input for the Z-bar switch arrangement may be decoded into select inputs for Z-bar switches 240-250.

In one embodiment of the present invention, pattern 234 is a low voltage applied to the select input of the Z-bar switch, and pattern 236 is a high voltage applied to the select input of the Z-bar switch.

In one embodiment of the present invention, the IC ports and the card slot ports carry differential signals.

In one embodiment of the present invention, two Z-bar switches are used to implement a bi-directional lane. Within this lane, one Z-bar switch carries signals transmitted from the IC ports to the card slots, and a second Z-bar switch carries signals transmitted from the card slots to the IC ports.

Slot Configuration

Figure 3:
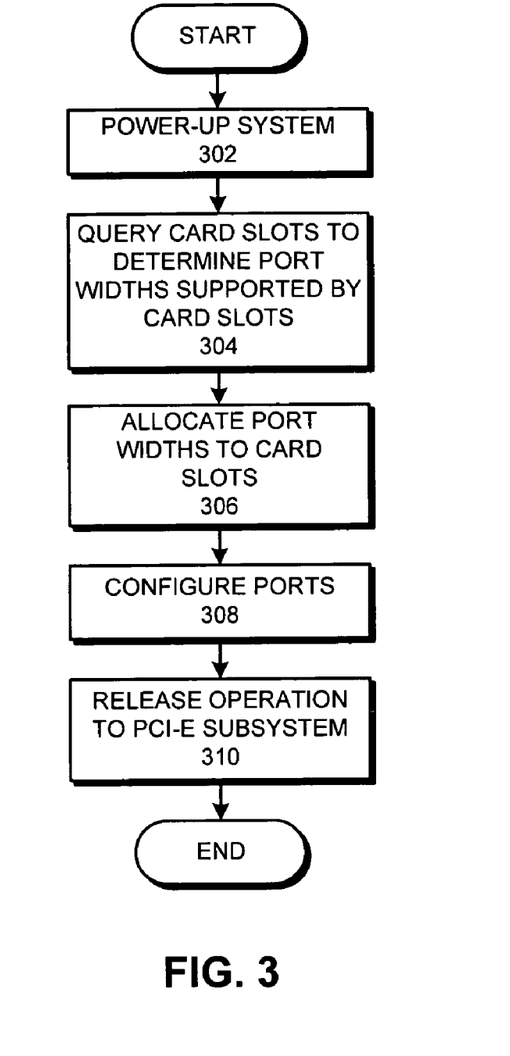
FIG. 3 presents a flow chart illustrating the process of switching IC ports to card slot ports in accordance with an embodiment of the present invention.

FIG. 3 presents a flow chart illustrating the process of switching IC ports to card slots in accordance with an embodiment of the present invention. The process begins when the system powers up (step 302). Next, the system queries the card slots to determine the port widths supported by the card slots (step 304) and allocates the port widths to the card slots (step 306). The system then configures the ports (step 308) and releases operation to the PCI-E subsystem (step 310). Note that this process occurs during system power-up.

The port-allocation process mentioned in step 306 can take place as follows. If slot 1 supports a ×8 width, then the system checks the preference flag for slot 1. If the preference flag for slot 1 slot indicates that the slot prefers a ×8 slot width, then the system allocates a slot width of ×8 to slot 0 and a slot width of ×8 to slot 1.

In one embodiment of the present invention, the configuration of the slots and allocation of the port widths is performed during system boot-up under software control.

In one embodiment of the present invention, the system is brought down prior to changing the configuration of the slots and the allocation of port widths.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus that couples an integrated circuit (IC) chip to card slots, comprising:
    a Z-bar switch which includes:
        exactly three switches;
        a select input;
        a first IC port coupled to a first IC pin;
        a second IC port coupled to a second IC pin;
        a first card slot port coupled to a first card slot pin;
        a second card slot port coupled to a second card slot pin;
        the first IC pin coupled to the input of a first switch, wherein the output of the first switch is coupled to the first card slot pin;
        the first IC pin coupled to the input of a second switch, wherein the output of the second switch is coupled to the second card slot pin;
        the second IC pin coupled to the input of a third switch, wherein the output of the third switch is coupled to the second card slot pin; and
        the output of the second switch is coupled to the output of the third switch;
    wherein if the select input receives a first control pattern, the Z-bar switch is configured to:
        couple the first IC pin to the first card slot pin; and to
        couple the second IC pin to the second card slot pin; and
    wherein if the select input receives a second control pattern, the Z-bar switch is configured to:
        couple the first IC pin to the second card slot pin;
        leave the second IC pin floating; and to
        leave the first card slot pin floating.

2. The apparatus of claim 1, wherein the first IC port, the second IC port, the first card slot port, and the second card slot port are configured to carry differential signals.

3. The apparatus of claim 2,
    wherein the Z-bar switch implements part of a lane, which is implemented using the Z-bar switch and a second Z-bar switch; and
    wherein the Z-bar switch is configured to switch signals transmitted to the card slots and the second Z-bar switch is configured to switch signals transmitted from the card slots.

4. The apparatus of claim 3, wherein the lane is one of multiple lanes.

5. The apparatus of claim 1, further comprising:
    a second Z-bar switch, wherein
        a first IC port of the second Z-bar switch is coupled to a third IC pin;
        a second IC port of the second Z-bar switch is coupled to a fourth IC pin
        a first card slot port of the second Z-bar switch is coupled to a third card slot pin; and
        a second card slot port of the second Z-bar switch is coupled to a fourth card slot pin; and
        a switch coupled to the second IC port of the first Z-bar switch and the first card slot pin of the second Z-bar switch;
    wherein, in response to a first control pattern, the Z-bar switches are configured to:
        couple the first IC pin to the first card slot pin;
        couple the second IC pin to the second card slot pin;
        couple the third IC pin to the third card slot pin; and to
        couple the fourth IC pin to the fourth card slot pin;
    wherein, in response to a second control pattern, the Z-bar switches are configured to:
        couple the first IC pin to the second card slot pin;
        couple the second IC pin to the third card slot pin;
        couple the third IC pin to the fourth card slot pin;
        leave the fourth IC pin floating; and to
        leave the first card slot pin floating.

6. The apparatus of claim 5, wherein the first IC port, the second IC port, the third IC port, the fourth IC port, the first card slot port, the second card slot port, the third card slot port, and the fourth card slot port are configured to carry differential signals.

7. The apparatus of claim 6,
    wherein the Z-bar switch implements part of a lane, which is implemented using the Z-bar switch and a second Z-bar switch; and
    wherein the Z-bar switch is configured to switch signals transmitted to the card slots and the second Z-bar switch is configured to switch signals transmitted from the card slots.

8. A method for coupling an integrated circuit (IC) chip to card slots, comprising:
    querying the card slots to determine port widths supported by the card slots;
    allocating the port widths to the card slots using a Z-bar switch which includes:
        exactly three switches;
        a select input;
        a first IC port coupled to a first IC pin;
        a second IC port coupled to a second IC pin;
        a first card slot port coupled to a first card slot pin;
        a second card slot port coupled to a second card slot pin;
        the first IC pin coupled to the input of a first switch, wherein the output of the first switch is coupled to the first card slot pin;
        the first IC pin coupled to the input of a second switch, wherein the output of the second switch is coupled to the second card slot pin;
        the second IC pin coupled to the input of a third switch, wherein the output of the third switch is coupled to the second card slot pin; and
        the output of the second switch coupled to the output of the third switch; and
    configuring ports.

9. The method of claim 8, wherein configuring the ports involves configuring a Z-bar switch to couple IC ports to card slot ports based on a control pattern applied to a select input of the Z-bar switch.

10. The method of claim 9,
    wherein if the select input receives a first control pattern, the method further comprises:
        coupling a first IC pin to a first card slot pin; and
        coupling a second IC pin to a second card slot pin; and
    wherein if the select input receives a second control pattern, the method further comprises:
        coupling a first IC pin to a second card slot pin;
        leaving a second IC pin floating; and
        leaving a first card slot pin floating.

11. The method of claim 10, wherein the first IC port, the second IC port, the first card slot port, and the second card slot port are configured to carry differential signals.

12. The method of claim 11,
    wherein the Z-bar switch implements part of a lane, which is implemented using the Z-bar switch and a second Z-bar switch; and
    wherein the Z-bar switch is configured to switch signals transmitted to the card slots and the second Z-bar switch is configured to switch signals transmitted from the card slots.

13. The method of claim 12, wherein the lane is one of multiple lanes.

14. The method of claim 9,
allocating the port widths to the card slots using a Z-bar switch which includes the Z-bar switch and a second Z-bar switch, wherein:
a first IC port of the second Z-bar switch is coupled to a third IC pin;
a second IC port of the second Z-bar switch is coupled to a fourth IC pin;
a first card slot port of the second Z-bar switch is coupled to a third card slot pin; and
a second card slot port of the second Z-bar switch is coupled to a fourth card slot pim and a switch coupled to the second IC port of the first Z-bar switch and the first card slot pin of the second Z-bar switch; and
wherein in response to a first control pattern, the method further comprises:
coupling a first IC pin to a first card slot pin;
coupling a second IC pin to a second card slot pin;
coupling a third IC pin to a third card slot pin; and
coupling a fourth IC pin to a fourth card slot pin;
wherein in response to a second control pattern, the method further comprises:
coupling the first IC pin to the second card slot pin;
coupling the second IC pin to the third card slot pin;
coupling the third IC pin to the fourth card slot pin;
leaving the fourth IC pin floating; and
leaving the first card slot pin floating.

15. The method of claim 14, wherein the first IC port, the second IC port, the third IC port, the fourth IC port, the first card slot port, the second card slot port, the third card slot port, and the fourth card slot port are configured to carry differential signals.

16. The method of claim 15,
wherein the Z-bar switch implements part of a lane, which is implemented using the Z-bar switch and a second Z-bar switch; and
wherein the Z-bar switch is configured to switch signals transmitted to the card slots and the second Z-bar switch is configured to switch signals transmitted from the card slots.

17. A computer system that couples an integrated circuit (IC) chip to card slots, comprising:
a Z-bar switch which includes:
exactly three switches;
a select input;
a first IC port coupled to a first IC pin;
a second IC port coupled to a second IC pin;
a first card slot port coupled to a first card slot pin;
a second card slot port coupled to a second card slot pin;
the first IC pin coupled to the input of a first switch, wherein the output of the first switch is coupled to the first card slot pin;
the first IC pin coupled to the input of a second switch, wherein the output of the second switch is coupled to the second card slot pin;
the second IC pin coupled to the input of a third switch, wherein the output of the third switch is coupled to the second card slot pin; and
the output of the second switch coupled to the output of the third switch;
wherein if the select input receives a first control pattern, the Z-bar switch is configured to:
couple the first IC pin to the first card slot pin; and to
couple the second IC pin to the second card slot pin; and
wherein if the select input receives a second control pattern, the Z-bar switch is configured to:
couple the first IC pin to the second card slot pin;
leave the second IC pin floating; and to
leave the first card slot pin floating.

18. The computer system of claim 17, wherein the first IC port, the second IC port, the first card slot port, and the second card slot port are configured to carry differential signals.

19. The computer system of claim 18,
wherein the Z-bar switch implements part of a lane, which is implemented using the Z-bar switch and a second Z-bar switch; and
wherein the Z-bar switch is configured to switch signals transmitted to the card slots and the second Z-bar switch is configured to switch signals transmitted from the card slots.

20. The computer system of claim 19, wherein the lane is one of multiple lanes.

* * * * *

UNITED STATES PATENT AND TRADEMARK OFFICE
CERTIFICATE OF CORRECTION

PATENT NO. : 7,653,776 B2 Page 1 of 1
APPLICATION NO. : 11/304439
DATED : January 26, 2010
INVENTOR(S) : William P. Cornelius et al.

It is certified that error appears in the above-identified patent and that said Letters Patent is hereby corrected as shown below:

In column 5, line 51, in claim 5, after "pin" insert -- ; --.

In column 7, line 14, in claim 14, delete "pim" and insert -- pin; --, therefor.

Signed and Sealed this

Twenty-sixth Day of October, 2010

David J. Kappos
*Director of the United States Patent and Trademark Office*